United States Patent [19]

Hilgers et al.

[11] Patent Number: 5,456,527
[45] Date of Patent: Oct. 10, 1995

[54] DRIVE MECHANISM FOR CRAWLER TRACKS

[75] Inventors: Lawrence C. Hilgers, Wauwatosa; Thomas P. Weber, Glendale, both of Wis.; Thomas G. Teller, Faribault; Philip M. Poeschl, Roseville, both of Minn.

[73] Assignee: Harnischfeger Corporation, Brookfield, Wis.

[21] Appl. No.: 168,346

[22] Filed: Dec. 17, 1993

[51] Int. Cl.⁶ ................................................. B62D 55/12
[52] U.S. Cl. ............................................. 305/57; 305/21
[58] Field of Search .................................. 305/21, 25, 28, 305/56, 57

[56] References Cited

U.S. PATENT DOCUMENTS

| | | | |
|---|---|---|---|
| Re. 30,039 | 6/1979 | Clemens et al. | 305/21 |
| 4,055,368 | 11/1977 | Sogge | 305/57 |
| 4,069,856 | 1/1978 | Sogge | 305/21 X |
| 4,080,008 | 3/1978 | Groff et al. | 305/57 |
| 4,087,136 | 5/1978 | Boggs et al. | 305/57 |
| 5,190,363 | 3/1993 | Brittain et al. | 305/57 |

*Primary Examiner*—Russell D. Stormer
*Attorney, Agent, or Firm*—ichard C. Ruppin

[57] ABSTRACT

A tumbler drive mechanism having a rotatable tumbler body mounted on a shaft and a plurality of tumbler lugs removably mounted on the tumbler body. The shaft has a longitudinal axis about which it and the tumbler rotate. The tumbler body includes a center drum and a plurality of circumferentially spaced apart radially projecting drive flanges. Each one of the plurality of tumbler lugs is mounted between and in engagement with two adjacent ones of the plurality of drive flanges. Each of the tumbler lugs engages the shoe lugs of a crawler track as the tumbler body rotates to drive the crawler track. The tumbler lug is mounted on the tumbler body at a selectively variable radial distance from the axis of the tumbler body. The radial distance at which the tumbler lugs are mounted on the tumbler body is accomplished by providing one or more shims positioned between the lug and the tumbler body.

18 Claims, 4 Drawing Sheets

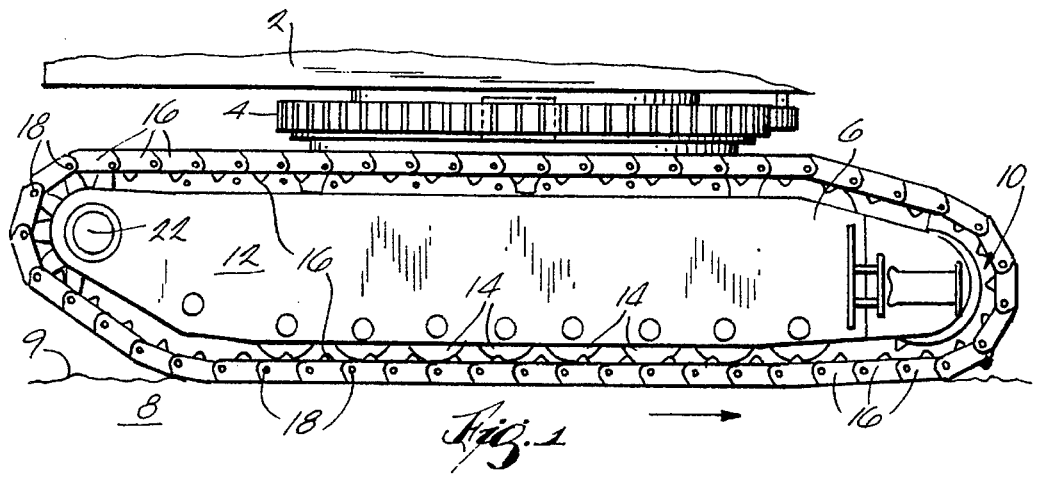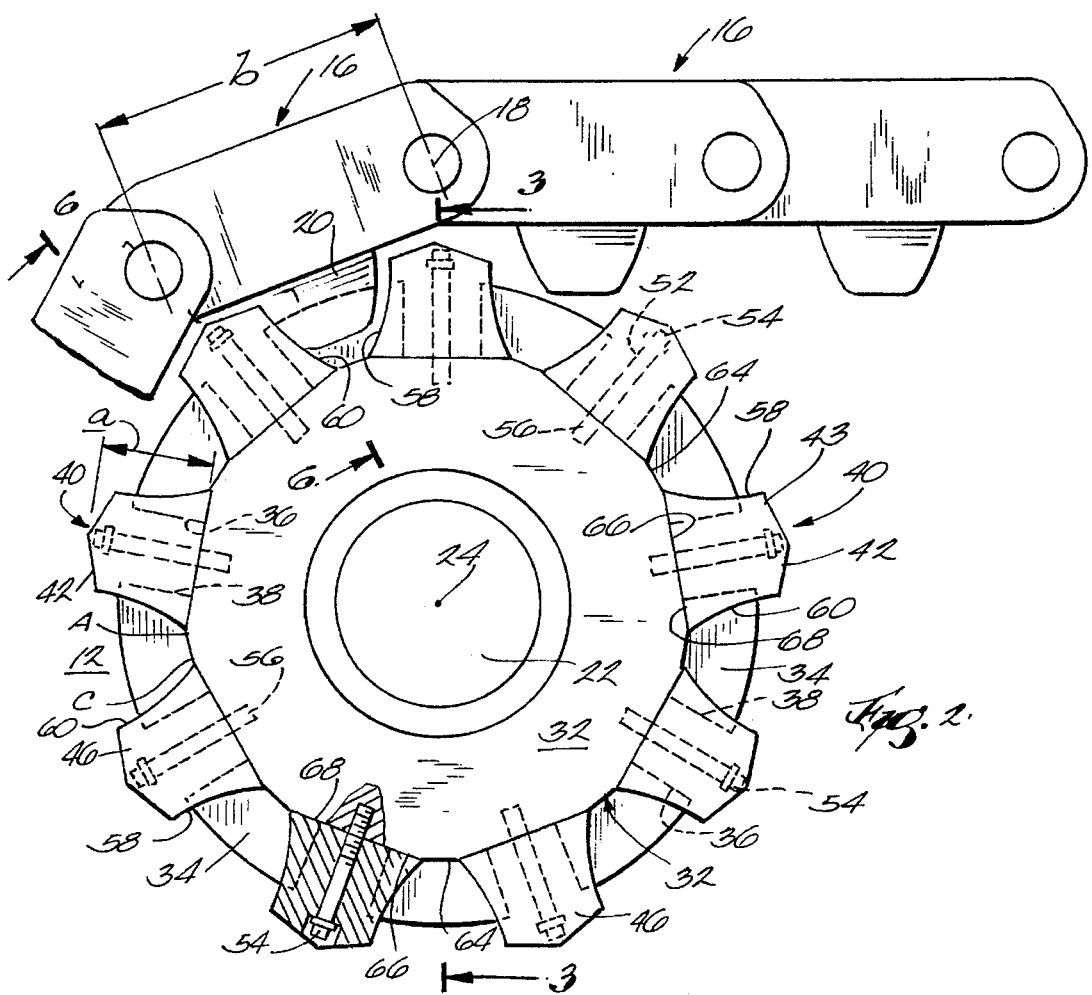

5,456,527

DRIVE MECHANISM FOR CRAWLER TRACKS

FIELD OF THE INVENTION

The invention relates to vehicles having ground engaging tracks made up of a series of pivotally connected links and more particularly to a drive means for the tracks.

BACKGROUND OF THE INVENTION

In vehicles driven by endless crawler tracks such as surface mining shovels, excavators, bulldozers and tanks, the crawler tracks include a series of links or shoes which are pivotally pinned together and have shoe lugs which are engaged and pushed by a rotating tumbler drive mechanism. The tumbler drive mechanism is mounted on a rotating shaft and has a sprocket-like shape including tumbler lugs which extend radially outward and engage the shoe lugs as the tumbler rotates to drive the shoes and thereby the entire crawler track. The crawler track and the tumbler are both subject to substantial wear which creates problems of proper fit between the tumbler lugs and shoe lugs and periodic replacement of the shoes, the tumbler and the shaft on which the tumbler is mounted. Since the shaft on which the tumbler is mounted, the tumbler, and the shoes all have different wear lives, additional complexity is involved in attempting to obtain maximum use out of the various components. The tumbler is subject to what might be considered normal wear due to abrasive engagement of the tumbler lugs with the shoe lugs and possible eventual fracture of the tumbler lugs. A second type of wear on the tumbler lugs is caused by wear of the crawler track resulting in an increase in the pitch, i.e., center to center distance at the connecting pins, of the shoes. Due to this pitch growth, the shoe lugs will interfere with the tumbler lugs and accelerate the wear on both types of lugs. Since there are fewer tumbler lugs, the damage to them is the most severe. Consequently, the tumbler has a shorter wear life than the crawler track and typically requires replacement twice as often as the shoe lugs. Because of the weight of the tumbler, its replacement necessitates the use of a crane which is expensive and increases the down time of the vehicle. Further, since the shaft on which the tumbler is mounted is supported in anti-friction bearings and the tumbler is very tightly mounted on the shaft, both the tumbler and the shaft must be removed in order to change the tumbler. In replacing the shaft and tumbler, there is risk of damaging the inboard anti-friction bearings of the shaft since the repositioning of the shaft must be done in a blind fashion.

SUMMARY OF THE INVENTION

The object of the present invention is to provide a tumbler drive mechanism in which the tumbler lugs are separate from the tumbler body and can be changed or radially positioned without removing the entire tumbler body from the vehicle. A further object of the invention is to provide tumbler lugs separate from a tumbler body but which transmit most of the drive and other forces on the tumblers directly to the tumbler body.

The invention is accomplished by providing a tumbler drive mechanism having a rotatable tumbler body mounted on a shaft and a plurality of tumbler lugs removably mounted on the tumbler body. The shaft has a longitudinal axis about which it and the tumbler rotate. The tumbler body includes a center drum and a plurality of circumferentially spaced apart radially projecting drive flanges. Each one of the plurality of tumbler lugs is mounted between and in engagement with two adjacent ones of the plurality of drive flanges. Each of the tumbler lugs engages the shoe lugs of a crawler track as the tumbler body rotates to drive the crawler track.

The tumbler lugs may be mounted on the tumbler body at a selectively variable radial distance from the axis of the tumbler body. The radial distance at which the tumbler lugs are mounted on the tumbler body is accomplished by providing one or more shims positioned between the lug and the tumbler body.

BRIEF DESCRIPTION OF THE DRAWINGS

Further objects and advantages of the invention will appear when taken in conjunction with the accompanying drawings, in which:

FIG. 1 is a side view of a lower portion of a surface mining shovel;

FIG. 2 is a side elevation view of a drive tumbler according to the invention;

DESCRIPTION OF THE PREFERRED EMBODIMENT OF THE INVENTION

Figure 3:
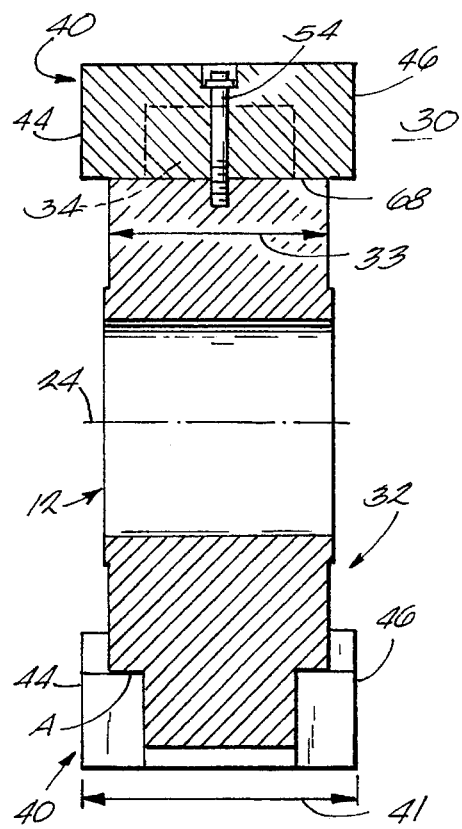
FIG. 3 is a cross-sectional view along lines 3—3 of FIG. 2.

The present invention has utility in a variety of types of crawler track driven vehicles. For purposes of disclosing the invention herein, it will be illustrated and described as used in a surface mining shovel.

With reference to FIG. 1, a portion of a surface mining shovel is illustrated including a part of the revolving frame 2 of the shovel, a ring gear 4 used in providing revolving motion for the frame 2, and a crawler frame 6 on which the revolving frame and ring gear are supported. An endless crawler track 8 is mounted on the crawler frame 6 and is held in position on the frame 6 by a rotating idler tumbler mechanism 10, a rotating drive tumbler mechanism 12, and a plurality of rollers 14.

Figure 6:
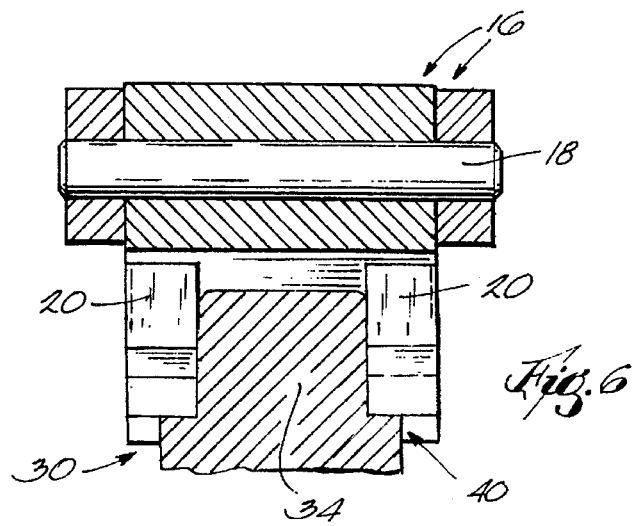
FIG. 6 is a cross-sectional view along lines 6—6 in FIG. 2.

The crawler track 8 includes a series of shoes 16, shown in FIGS. 1, 2 and 6, which are pivotally connected to adjacent shoes by pins 18. Each shoe 16 includes a pair of shoe lugs 20 which are engaged by the drive tumbler 12 as the crawler track 8 passes over the rotating drive tumbler 12. The crawler track 8 is thereby driven along the earth surface 9 in the direction of the arrow in FIG. 1, for example, to propel the shovel along the earth surface.

The drive tumbler 12 is shown in greater detail in FIGS.

2–5 and includes a tumbler body 30 mounted on a rotatable drive shaft 22 driven by a power source (not shown) mounted on the crawler frame 6. The tumbler body 30 has a width 33 and includes a center drum 32 in engagement with the shaft 22, an outer peripheral surface 64, and a plurality of drive flanges 34 projecting radially outward of the center drum. The drive flanges 34 are spaced apart in a circumferential direction and adjacent ones of the drive flanges have facing ends or sides 36 and 38 defining slots 28 between the adjacent flanges. The peripheral surface 64 includes spaced apart flat surfaces 66 aligned circumferentially with the slots 28.

Figure 5:
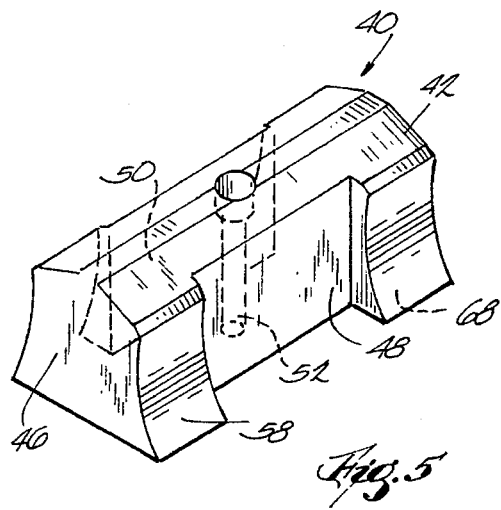
FIG. 5 is a perspective view of a tumbler lug used in the drive tumbler of FIG. 2.
Figure 4:
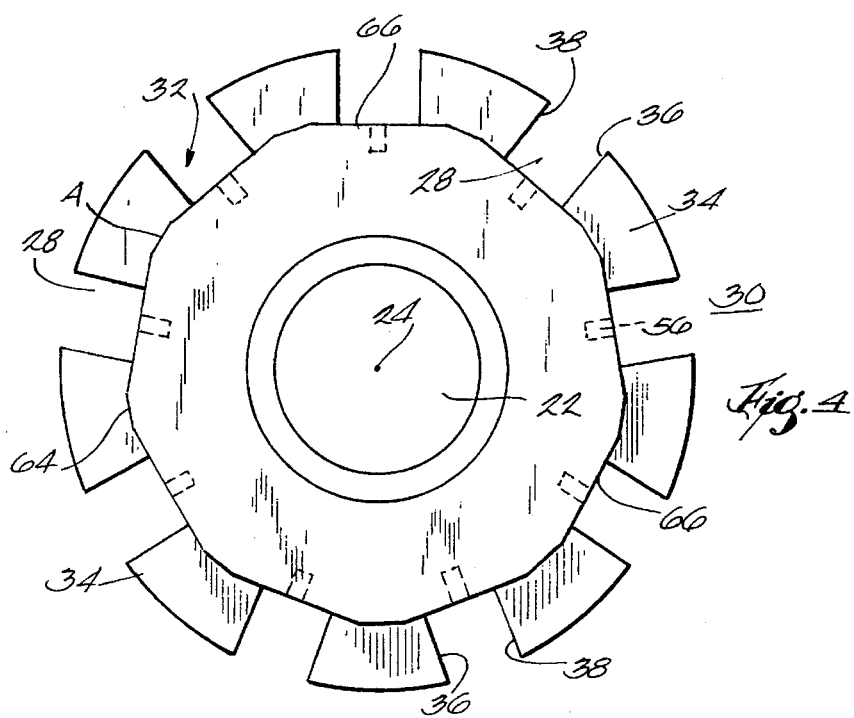
FIG. 4 is a side elevation view of the tumbler body of the drive tumbler shown in FIG. 2.

The drive tumbler 12 also includes tumbler lugs 40 as shown in FIGS. 2 and 3 and in the perspective view of FIG. 5. Each tumbler lug 40 comprises a block member 43 having a height a, and an axial width 41 wider than the width 33 of the tumbler body. The lug 40 further includes a radially outward crown surface 42, axially opposite faces 44 and 46 defining the axial width 41 of the tumbler 40, slots 48 and 50 extending generally radially outward of the tumbler body when the lug 40 is mounted on the center drum 32 of the tumbler body 30, and a radially inward mounting surface 68 engaging a surface 66 of the tumbler body when the lug is mounted on the tumbler body. The slots 48 and 50 respectively receive, preferably in a snug fitting manner, the ends 38 and 36 of adjacent drive flanges 34 so that the tumbler lugs fit into the space of slots 28 between adjacent drive flanges. The tumbler lugs 40 further include through openings 52 extending in a generally radial direction through which fastening means such as bolts 54 are extended and threadably received in threaded openings 56 in the center drum 32 for attaching the lugs 40 to the tumbler body 30. Each of the tumbler lugs 40 also include shoe engaging surfaces 58 and 60 which move against and push the shoe lugs 20 to transfer rotating motion of the drive tumbler 12 to the shoes. In FIG. 2, the shoes 16 may be considered to be new and have a pitch distance b.

Figure 7:
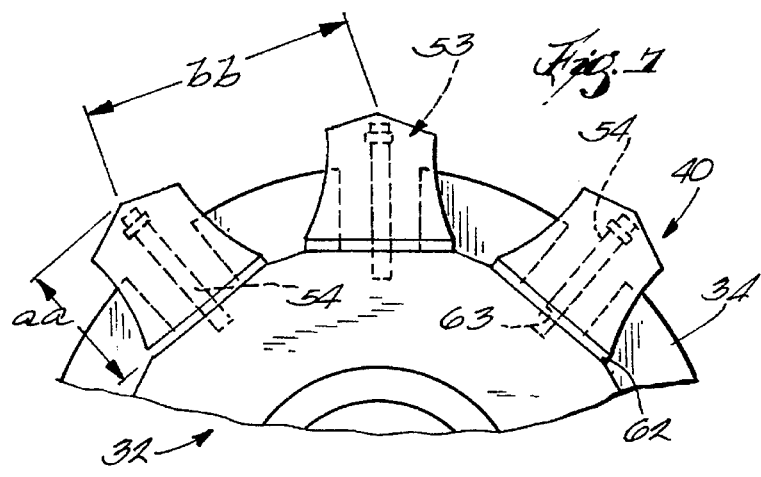
FIG. 7 shows a broken away portion of FIG. 2.
Figure 7A:
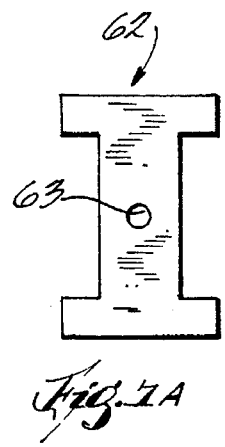
FIG. 7A is a plan view of the shim illustrated in FIG. 7.

With reference to FIGS. 7 and 7A, tumbler lugs 40 are shown with a shim 62 positioned between each lug and the center drum 32 on which the lugs 40 are mounted. The shims each have an opening 63 through which a fastening bolt 54 extends. The placing of the shims 62 between the tumbler lugs and the center drum results in the tumbler lugs being positioned further radially outward from the tumbler body 30 to a height aa. Further, moving the tumbler lugs radially outward increases the distance between the tumbler lugs 40 to correspond to an increased spacing distance between shoe lugs 20 as the crawler track 8 and shoes 16 wear and stretch and the pitch of the shoes 16 increases to a distance bb. Thereby, the increased pitch distance of the crawler track can be accommodated and the interfit of the tumbler lugs and shoe lugs maintained without the need to remove the entire drive tumbler and shaft 22 and mount a new drive tumbler.

Figure 8:
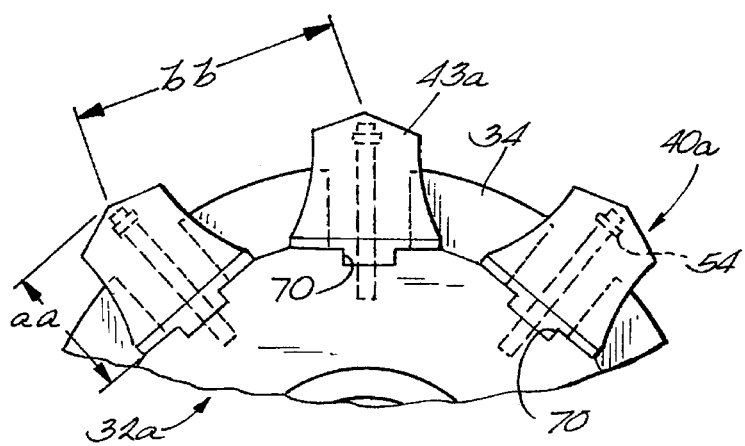
FIG. 8 shows a broken away portion of an alternate embodiment of the drive tumbler shown in FIG. 2.

In FIG. 8, an alternative embodiment of the invention is shown in which the center drum is designated 32a, the tumbler lugs are designated 40a, and the block members are designated 43a. The center drum 32a includes axially directed slots 70 facing in a radially outward direction opposite each tumbler lug 40a. Each lug 40a has an axial rib 72 received in one of the slots 70 to assist with the transfer of force from the center drum of the tumbler body to the crawler track. The crawler track 8 and shoes 16 shown in FIG. 8 may also be considered to be in a worn and stretched condition such that the pitch distance is bb. However, the lugs 40a have a height aa to accommodate the increased pitch bb of the shoes. Thus, the interfit of the tumbler lugs and shoe lugs can be maintained by installing greater height tumbler lugs such as lugs 40a without the need to remove the entire drive tumbler and mount a new tumbler.

Figure 9:
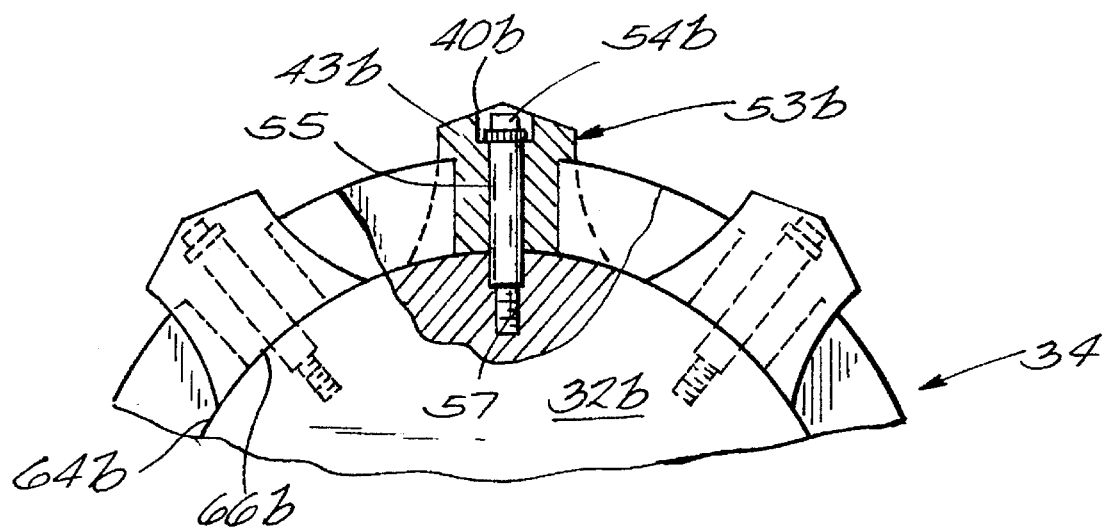
FIG. 9 shows a broken away portion, partially in cross-section, of another alternate embodiment of the drive tumbler shown in FIG. 2.

Another embodiment of the invention is shown in FIG. 9 in which the center drum of the tumbler body is designated 32b, the tumbler lugs are designated 40b, and the lug block members are designated 43b. The center drum 32b has an outer peripheral surface 64b which is circular in shape. The lugs 40b have mounting surfaces 66b which have the same curvature as the peripheral surface 64b of the center drum 32b and are mounted against the surface 64b as shown in FIG. 9. The embodiment shown in FIG. 9 further includes fastening bolts 54b of a socket head cap screw type in which the shank 55 of the bolt 54b comprises a dowel member having a relatively large diameter extending from within the lug 40b to within the center drum 32b and the bolt 54b is held on the center drum 32b by a threaded end 57 having a diameter smaller than that of the shank 55. The fastening bolt 54b provides the thick dowel shank 55 to assist in holding the lug 40b against axial and circumferential shear stresses on the lug 40b.

Figure 10:
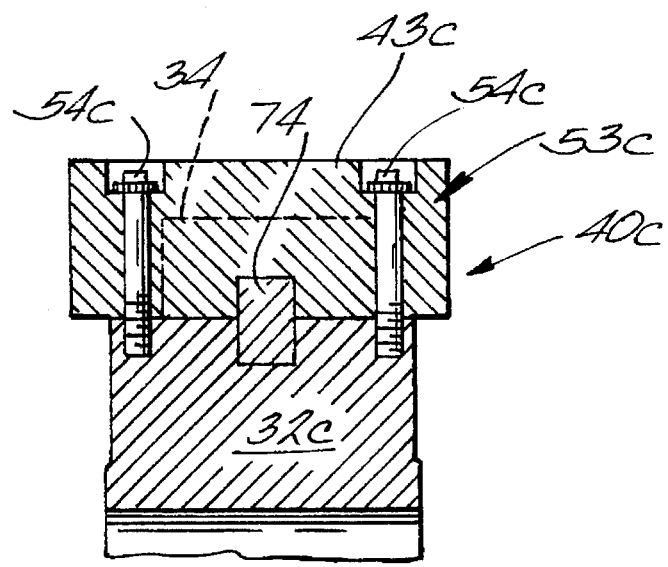
FIG. 10 shows, in cross-section, a further alternative embodiment of the drive tumbler of the invention.

Another alternative embodiment is shown in FIG. 10 in which the tumbler lugs are designated 40c, the lug block members are designated 43c, the center drum is designated 32c, and fastening means 57 is provided. The fastening means 57 includes bolts 54c and a captured dowel 74 extending from within the block member 43c into the tumbler body of the center drum 32c to thereby assist in holding against circumferential and axial shear stresses on the lug 40c. The bolts 54c may be of the same type as bolts 54b in the embodiment of FIG. 9 or alternatively may be the type of bolts shown in the embodiment of FIG. 3.

With a snug fit between the tumbler lugs 40 and the drive flanges 34, the entire circumferential driving force is transmitted from the tumbler drive 12 to the crawler track 8 through the lugs 40. Because the drive flanges 34 are received within the slots 48 and 50 of the tumbler lugs 40, lateral or axial forces on the drive tumbler are also readily transferred through the lugs 40 to the tumbler body so that they absorb little of such force. Because the bolts 54 hold the lugs 40 tightly against the center drum 32, radially directed forces are also substantially entirely transmitted through the lugs 40 to the tumbler body 30. Consequently, the tumbler lugs receive very little forces from either the rotating propulsion of the tumbler or the reaction of the crawler track as it moves over the ground surface.

Because the lugs are removable, they are relatively easy to replace. The replacement work requires only that the crawler track be removed from the drive tumbler and the lugs replaced, rather than the removal of the entire drive tumbler and shaft. As previously described, wear of the crawler shoes which results in increased shoe pitch can be readily accommodated by shimming the tumbler lugs radially outward or replacing the tumbler lugs with lugs of a greater height rather than replacing the entire drive tumbler as is required with present tumblers.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. A tumbler for driving a crawler track comprising:

a tumbler body rotatable about an axis and having a plurality of circumferentially spaced apart radially projecting drive flanges;

a plurality of lugs removably mounted on the tumbler body between adjacent drive flanges, each of the plurality of lugs including two generally radially extending slots, each slot facing and in receiving engagement with a drive flange; and the plurality of lugs drivably engage the crawler track as the tumbler body rotates.

2. The tumbler according to claim 1 wherein each of the lugs are mountable on the tumbler body at a selectively variable radial distance from the axis of the tumbler body.

3. The tumbler according to claim 2 further comprising at least one shim positioned between at least one of the lugs and the tumbler body to thereby position said one lug relative to the axis of the tumbler body.

4. The tumbler according to claim 1 further comprising bolt means for mounting the plurality of lugs on the tumbler body, the bolt means being free of circumferential shear load.

5. The tumbler according to claim 1 wherein the bolt means extends in a radial direction.

6. The tumbler according to claim 1 further comprising bolt means for mounting each of the plurality of lugs on the tumbler body, the bolt means having a threaded end including a first diameter in the tumbler body and a dowel portion extending from a lug into the tumbler body and having a second diameter larger than the first diameter.

7. The tumbler according to claim 1 further comprising fastening means for mounting each of the lugs on the tumbler body, the fastening means including at least one threaded bolt and a dowel contained within the lug and tumbler body.

8. The tumbler according to claim 1 wherein the tumbler body includes an axial directed slot opposite to and receiving each one of the plurality of lugs.

9. The tumbler according to claim 1 wherein:

the tumbler body has a plurality of circumferentially spaced apart flat lug mounting surfaces; and each lug has a flat bottom surface in engagement with one of the flat lug mounting surfaces.

10. The tumbler according to claim 1 wherein:

the tumbler body has a circular radial outward facing lug mounting surface; and each lug has a circular bottom surface having the same radius of curvature as and in engagement with the circular surface of the tumbler body.

11. A tumbler lug for use with a drive tumbler body having an axis about which the tumbler body is rotatable comprising:

a block member removably mountable on the tumbler body in a position extending radially outward of the tumbler body;

the block member having opposite sides facing substantially in a circumferential direction when the block member is mounted on the tumbler body; and radially extending slots in each of said block sides engageable with the tumbler body.

12. The tumbler lug according to claim 11 wherein the block member includes a through opening in a radial direction when the block member is mounted on the tumbler body whereby means for mounting the block on the tumbler body may be inserted through the block.

13. The tumbler lug according to claim 11 wherein the block member has a radial inward flat mounting surface engageable with the tumbler body.

14. The tumbler lug according to claim 11 wherein the block member has a radial inward curved mounting surface engageable with the tumbler body.

15. The tumbler lug according to claim 11 wherein the block member has a radial inward mounting surface including an axial rib engageable with the tumbler body.

16. The tumbler lug according to claim 11 wherein the tumbler body has an axial width and the block member has an axial width greater than the axial width of the tumbler body.

17. The tumbler lug according to claim 11 further comprising fastening means for mounting the block member on the tumbler body, the fastening means including at least one threaded bolt and a dowel contained within the block member and tumbler body.

18. The tumbler lug according to claim 11 further comprising a fastening bolt extending in a radial direction through the block member and into the tumbler body, the bolt having a threaded end including a first diameter in the tumbler body and a dowel portion extending from the block member into the tumbler body and having a second diameter larger than the first diameter.

* * * * *